(12) United States Patent
Reiss et al.

(10) Patent No.: US 10,273,006 B2
(45) Date of Patent: Apr. 30, 2019

(54) TROLLEY, WASTE MODULE AND SYSTEM FOR COLLECTING WASTE

(71) Applicant: Airbus Operations GmbH, Hamburg (DE)

(72) Inventors: Matthias Reiss, Hamburg (DE); Nicolas Jourdan, Hamburg (DE); Ralf Schliwa, Hamburg (DE); Donald De Gutz, Hamburg (DE); Gabriel Ribeiro Reis, Sao Paulo-SP (BR); Denise Renata Passos Ikuno, Sao Paulo (BR); Liana Maki Shintate, Sao Paulo-SP (BR); Tadeu Kendy de Oliveira Omae, Sao Paulo (BR); Lucas Marques Otsuka, Santo Andre (BR); Lucas Neumann De Antonio, Sao Paulo-SP (BR)

(73) Assignees: AIRBUS OPERATIONS GMBH, Hamburg (DE); AIRBUS SAS, Blagnac (FR); AIRBUS AMERICAS, INC., Mobile, AL (US)

( * ) Notice: Subject to any disclaimer, the term of this patent is extended or adjusted under 35 U.S.C. 154(b) by 0 days.

(21) Appl. No.: 15/281,133

(22) Filed: Sep. 30, 2016

(65) Prior Publication Data
US 2018/0093773 A1  Apr. 5, 2018

(51) Int. Cl.
*B62B 3/04* (2006.01)
*B64D 11/00* (2006.01)
(Continued)

(52) U.S. Cl.
CPC ............ *B64D 11/0007* (2013.01); *B30B 1/12* (2013.01); *B30B 9/321* (2013.01); *B62B 3/005* (2013.01);
(Continued)

(58) Field of Classification Search
CPC ............ B62B 3/002; B62B 3/10; B62B 3/006
(Continued)

(56) References Cited

U.S. PATENT DOCUMENTS

| | | | | | |
|---|---|---|---|---|---|
| 4,670,227 | A | * | 6/1987 | Smith | ...................... A61L 11/00 280/33.998 |
| 5,015,143 | A | * | 5/1991 | Carson | ...................... B65F 1/004 220/324 |

(Continued)

FOREIGN PATENT DOCUMENTS

| | | |
|---|---|---|
| EP | 2236390 A1 | 3/2010 |
| EP | 2236390 A1 | 10/2010 |

(Continued)

OTHER PUBLICATIONS

Quintanilha, Leandro, Team Retrolley, Published May 18, 2015, Retrieved via YouTube Jan. 12, 2017. (https://www.youtube.com/watch?v=75sVDajZaW4).

(Continued)

*Primary Examiner* — Jeffrey J Restifo
(74) *Attorney, Agent, or Firm* — Lorenz & Kopf LLP (57) ABSTRACT

A trolley for collecting waste includes a housing having a main waste chamber for receiving waste, and wheels attached to a bottom wall of the housing. The housing has at least one module seating, each configured to receive a waste module for collecting waste. Each module seating includes fasteners configured to releasably couple to a waste module. The waste module includes a module housing having at its top surface a top opening for inserting waste, and having a module waste chamber for receiving waste inserted through the top opening. The module housing includes second connection means at its outside surface, which are configured to releasably interact with first connection means of a trolley for collecting waste. Also disclosed herein is a system that (Continued)

includes the trolley and at least one waste module inserted into the at least one module seating.

14 Claims, 6 Drawing Sheets

(51) Int. Cl.
  *B30B 1/12* (2006.01)
  *B30B 9/32* (2006.01)
  *B62B 3/00* (2006.01)
  *B64D 11/04* (2006.01)
  *B65F 1/14* (2006.01)

(52) U.S. Cl.
  CPC ............ *B64D 11/04* (2013.01); *B65F 1/1426* (2013.01); *B65F 1/1473* (2013.01); *B65F 1/1463* (2013.01); *B65F 2210/162* (2013.01); *B65F 2240/12* (2013.01)

(58) Field of Classification Search
  USPC .................................. 280/79.3, 47.35, 47.34
  See application file for complete search history.

(56) References Cited

U.S. PATENT DOCUMENTS

| | | | | |
|---|---|---|---|---|
| 5,303,841 | A * | 4/1994 | Mezey | B65F 1/004 220/555 |
| 5,611,270 | A * | 3/1997 | Harrington | B30B 9/323 100/102 |
| 6,139,034 | A * | 10/2000 | Williams | A47B 31/06 280/47.35 |
| 7,544,915 | B2 * | 6/2009 | Hu | B62B 3/006 219/387 |
| 8,001,887 | B2 * | 8/2011 | Harari | B65F 1/1405 100/229 A |
| 8,465,030 | B2 * | 6/2013 | Boivin | B62B 3/004 280/47.34 |
| 8,596,655 | B2 * | 12/2013 | Belanger | B29C 65/483 156/92 |
| 8,690,170 | B2 * | 4/2014 | Belanger | B29C 70/86 280/47.34 |
| 8,696,028 | B2 * | 4/2014 | Nelson | A47L 13/50 280/47.34 |
| 8,936,260 | B2 * | 1/2015 | Burd | B62B 3/003 280/47.35 |
| 9,193,462 | B2 * | 11/2015 | Burd | B62B 3/003 |
| 9,205,951 | B1 * | 12/2015 | Roman | B65D 21/0233 |
| 9,669,930 | B2 * | 6/2017 | Boivin | B64D 11/0007 |
| 9,809,239 | B1 * | 11/2017 | Reiss | B62B 3/004 |
| 2007/0069490 | A1 | 3/2007 | Japuntich et al. | |
| 2010/0140890 | A1 * | 6/2010 | Boivin | B62B 3/003 280/47.34 |
| 2011/0025006 | A1 * | 2/2011 | Knoppers | A47B 31/00 280/47.34 |
| 2011/0248458 | A1 * | 10/2011 | Belanger | B29C 65/483 280/47.35 |
| 2011/0277489 | A1 * | 11/2011 | Schalla | A47B 31/02 62/89 |
| 2011/0278879 | A1 * | 11/2011 | Belanger | B29C 70/86 296/187.01 |
| 2011/0283900 | A1 | 11/2011 | Fritz et al. | |
| 2012/0103206 | A1 * | 5/2012 | Doaran | B30B 9/301 100/35 |

FOREIGN PATENT DOCUMENTS

| | | |
|---|---|---|
| EP | 2949459 A1 | 12/2015 |
| GB | 2500945 A | 10/2013 |
| WO | 9105720 A1 | 10/1990 |
| WO | 9105720 A1 | 5/1991 |

OTHER PUBLICATIONS

Ikuno, Denise; Maki, Liana; Neumannn, Lucas;Otsuka, Lucas; Omae, Tadeu; Airbus FYI Report 2015, Retrolley, pp. 1-27.
Neumann, Lucas, Retrolley (Industrial), pp. 1-9. (http://lucasn.com/trolley/html).
European Patent Office International Searching Authority, Invitation to Pay Additional Fees and, Where Applicable, Protest Fee and Annex to Form PCT/ISA/206 Communication Relating to the Results of the Partial International Search in International Application No. PCT/EP2017/074670 dated Jan. 5, 2018.
International Searching Authority, International Search Report and Written Opinion for International Patent Application PCT/EP2017/074670, dated Mar. 26, 2018.

* cited by examiner

TROLLEY, WASTE MODULE AND SYSTEM FOR COLLECTING WASTE

TECHNICAL FIELD

An exemplary embodiment of the present invention relates to a trolley for collecting waste, a waste module for collecting waste and a system for collecting waste.

BACKGROUND

In large passenger vehicles, in particular in aircrafts for long haul flights, passenger capacities tend to be ever increasing, while at the same time the efficiency of the available space inside the cabin is more and more improved. For example, cabin monuments, such as galleys and lavatories, are increasingly space efficient and allow the integration of an optimized amount of passenger seats. Besides storing food and other items it is mandatory to provide sufficient space for collecting waste.

Waste may arise from meal packages and other used items from the passengers. Simply collecting waste would lead to a plurality of bulky plastic bags, which need to be stored safely. To improve the waste collection and storage, it is known to use waste compaction systems, which may compact bulky plastic bags containing meal packages, etc. into compact and easily storable waste packages.

The most common approach for waste compaction systems in civil aircraft is based on electromechanical waste compactors, which are rather powerful but comprise a high weight due to the mechanical components such as an electrical motor, gears, supports and bearings. As a result, a large part of the available space in a half size or full size trolley may be allocated for the electromechanical waste compactor, such that only a reduced amount of waste is collectable with this trolley. Further, due to the weight of the electromechanical compactor, the electromechanical compactor is usually a fixed part of the galley and cannot be moved through the cabin. The available space for storing waste and/or other goods in the galley is therefore reduced, while the reliability of electromechanical waste compactors may be low and/or insufficient.

It is further known to use vacuum-based waste compactors, which comprise vacuum connector at the trolley unit that comprise a sleeve or hull surrounding a waste bag, which sleeve or hull is evacuated and thereby presses the waste bag to a compact package via applying a vacuum. However, compacting the waste in the trolley via a vacuum requires a vacuum source to which the connector of the trolley is to be connected, if the compaction of waste is to be carried out. Thus, for compacting the waste, the trolley has to be connected to the vacuum source. In particular, an intermediate compaction of waste collected by the trolley may not be practical, as the vacuum source may just be available at the galley. Patent document EP2949459A1 illustrates such a trolley.

Even though vacuum-based waste compactors may overcome the disadvantages of a electromechanical waste compactor, vacuum-based waste compactors may suffer from a further disadvantage. Waste collected in a waste bag may comprise different kinds of waste. Waste may comprise packages, bottles, cans, plastic packaging material, paper packaging material, carton packaging material, cups, leftover food and liquids. Some of this waste may be easily compacted, wherein other waste may not be easily compacted. In particular, liquids may not be subject to a compaction. And even cans and cups may require large forces in order to be compacted. It has been found in practice, that vacuum-based waste compactors may not allow a high compaction rate resulting from waste parts having a high form stability and/or being incompressible.

BRIEF SUMMARY

In view of the known waste compactors, it may be desirable to provide a new approach for mobile waste compaction, which allows to handle waste depending on its type and further to allow a high compaction of form-stable waste. Consequently, an alternative trolley, a waste module and/or a system for collecting waste are provided by the exemplary embodiments described herein. An embodiment of the invention may handle collected waste depending on its type and at the same time allows a high compaction rate of compressible waste.

Certain advantages are provided by a trolley according to claim 1. Advantageous embodiments and/or further improvements may be gathered from the sub-claims and/or from the following description.

A trolley for collecting waste is proposed comprising a housing, which comprises a main waste chamber for receiving waste, and wheels, which are attached to a bottom wall of the housing. The housing further comprises at least one module seating. Each module seating is configured to receive a waste module for collecting waste. Further, each module seating comprises fasteners, which are configured to releasably couple a waste module.

As a result, the main waste chamber of the housing of the trolley may serve for collecting all types of waste, which may be easily compactable. Thus, the main waste chamber may serve for collecting residual waste.

Furthermore, the housing comprises the at least one module seating, which is configured to receive a waste module. Thus, the module seating may be casing formed by the housing of the trolley. A waste module may be configured for collecting waste, which may just be compacted under high forces and/or high pressure. Furthermore or alternatively, a further waste module may be received by the same module seating or a further module seating of the housing. This further waste module may be configured to collect incompressible waste, for instance liquids. As a result, the trolley is configured to releasably incorporate waste modules, which are advantageously configured to receive and/or compact specific waste types. Consequently, the trolley provides the ability to be adapted, such that all kinds of compressible and/or incompressible waste may be collected and in particular be compacted at and/or with the trolley or with waste modules incorporated thereto. Even if incompressible waste, such as liquids, are to be collected, the trolley is adapted by its module seating to incorporate a respective waste module in order to separately collect such waste. As a further result, easily compressible waste may be collected in the main waste chamber, wherein cups or cans may be collected via further specific waste modules received by the at least one module seatings of the housing of the trolley. Since incompressible waste, in particular liquids, and/or form-stable waste, such as cans and/or cups, may be collected and processed separately, an overall compaction rate of waste collected via the trolley may be increased.

In particular, depending on the types of waste to be collected, the at least one module seating of the housing of the trolley allows to be received by a respective waste module. Thus, the waste module received by the module seating may be exchanged, if a different waste is supposed to be collected. As an even further effect of the trolley, a waste module received by the at least one module seating may be replaced, if the waste module is filled with a specific type of waste. For instance, if a waste module is configured to collect cans and if said waste module is filled up with collected cans, said waste module may be replaced with a new waste module, which is also configured to collect cans. An analogous procedure may be performed, if the waste module is specifically configured to collect a different type of waste.

In order to fasten a waste module, each module seating comprises fasteners, which are configured to releasably couple a waste module. Thus, a waste module may be inserted into the module seating, such that the waste module is received by the module seating. Thereby and/or thereafter, the fasteners of the module seating may be configured to interact with the waste module, such that the waste module is fastened to the module seating. As a consequence, a mechanical connection may be provided between the waste module and the module seating. This preferably refers to the coupling of the waste module to the module seating. Furthermore, the mechanical connection between the waste module and the module seating is releasable. For this purpose, the housing of the trolley may comprise an operation means, in particular an operation button, which is functionally connected to the fasteners of the module seating. Furthermore, the module seating may be configured, such that operating the operation means may result in a release of the waste module from the module seating. Thus, after operating the operation means, the waste module may be disengaged from the module seating, such that the waste module may be extracted from the module seating. As a result, the module seating may be available to receive a new waste module. Furthermore, the module seating of the housing may be configured, such that the fasteners automatically couple to a waste module, if the waste module is received by the module seating. The mechanical connection between the waste module and the module seating provided by the fasteners may relate to a releasable force-fit connection and/or a releasable form-fit connection.

According to an exemplary embodiment of the trolley, each module seating forms a receiving space to at least partly or fully receive a waste module. In particular, each module seating forms a receiving space to at least partly or fully receive at least one waste module. As a result, one waste module or a plurality of waste modules may be fully or each at least partly received by the receiving space of a module seating. In case the at least one waste module may be fully received by the receiving space of a module seating, outer dimensions of the trolley may not be extended. Thus, the trolley may maintain its outer dimensions. This may be of particular advantage, if the trolley is a standard size trolley, in particular if the trolley is a half size trolley or a full size trolley. Such trolleys may be trolleys, which are used within a cabin of an aircraft. As a result, the trolley may also be referred to as a cabin aircraft trolley. In case a waste module is just partly received by the receiving space of a module seating, the remaining part of the waste module not being received by the receiving space, and thus may extend above the outer dimensions of the trolley. As a result, the capacity for collecting waste via the trolley may be extended by the at least one waste module, which is just partly received by the receiving space of the module seating. Thus, the trolley may be used during the collection waste with waste modules extending above the outer dimension of the trolley, while after the collection of waste, the respective waste module may be disengaged from the module seating and placed at a different place, in particular within a galley of a cabin of an aircraft. As a result, the trolley may provide thereafter with a standard size, such that the trolley may also be placed within the cabin of an aircraft, in particular within the galley of an aircraft at a respective parking space.

According to a further embodiment of the trolley, each module seating may be configured to receive and/or fasten a single waste module. As a result, the module seating may provide an enhanced fasting for a waste module.

According to a further embodiment of the trolley, the housing of the trolley may comprise a plurality of module seatings. The module seatings may be divided by separating walls.

According to a further embodiment of the trolley, the or at least one of the module seatings may be configured to receive a plurality of waste modules. For this purpose, such a module seating may be configured to separately fasten each of the plurality of waste modules individually. Thus, the module seating may comprise fasteners, in particular separate fasteners, which are configured to individually and releasably couple each of a plurality of waste modules, which may be received by the module seating.

The fasteners for releasably coupling a waste module may be arranged at a lateral side wall and/or at a back side wall, each forming boundary surfaces of the receiving space. Furthermore, if the housing comprises a plurality of module seatings, which are separated by at least one separating wall, fasteners may also be arranged at said at least one separating wall.

According to a further embodiment of the trolley, each module seating comprises first connection means at the respective module seating's inside surface, wherein the first connection means are configured to releasably interact with second connection means of a waste module. As a result, the first connection means may form a part of the fasteners or may form the fasteners as such. Furthermore, the first connection means may be arranged at one of the walls, which have been explained previously, in particular at the lateral side wall, at the back side wall and/or at the separating wall. Furthermore, the first connection means and the second connection means are preferably correspondingly configured and/or formed. Thus, if a waste module is received by a module seating, the second connection means of the waste module may releasably interact automatically with the first connection means of the module seating. Furthermore, the first and/or second connection means may be configured, such that an automatic mechanical connection may be established in order to securely couple the waste module to the module seating. To decouple the waste module from the module seating, the previously explained operation means may be operated, such that the interaction of the second connection means and the first connection means may be released.

According to a further embodiment of the trolley, each module seating extends to a side surface of the housing, wherein each module seating comprises a side opening at the side surface of the housing, such that a waste module may be inserted through the side opening into the respective module seating. Each module seating is a part of the housing of the trolley. Thus, providing a side opening at the side surface of the housing, the respective side opening is assigned to the respective module seating and/or refers thereto. The side surface of the housing preferably refers to a front surface of the housing. Further preferred, the housing comprises a bottom surface, a top surface, a front surface, a back surface and two lateral surface. Each of the front surface, back surface and lateral surfaces preferably extends from the bottom surface to the top surface. The bottom surface is preferably formed by a bottom wall of the housing. The lateral surface of the housing may be formed by lateral side walls. At least a part of the front side surface is configured to be opened, in particular by at least one recess, which may form the at least one side opening. As a consequence, a waste module may be inserted through the side opening into a module seating of the housing. Similarly, a released waste module may be removed through said side opening.

According to a further embodiment of the trolley, each module seating extends to a top surface of the housing, wherein each module seating comprises a top opening at the top surface of the housing, such that waste may be inserted through the top opening. Preferably, each module seating extends to a separate top opening of the housing at the top surface of said housing. Thus, each of said top openings may form a respective opening in the top surface of the housing. Each of said top opening may be assigned to one of the module seatings and/or refer thereto. Alternatively, the housing may be configured to provide a single top opening for all module seatings. Thus, this top opening may be referred to an integral top opening, which is assigned to a plurality of module seatings and/or refer thereto. The at least one top opening is used to insert waste. Thus, if a waste module is inserted to a module seating, waste may be inserted through the top opening into the waste module in order to collect said waste within said waste module.

According to an exemplary embodiment of the trolley, the housing of the trolley comprises a plurality of module seatings. The plurality of module seatings are arranged in parallel, such that the top openings and/or the side openings are also arranged in parallel. Furthermore, the module seatings may be arranged in parallel, such that their receiving spaces may also be arranged in parallel. Thus, the side openings may be arranged at the same front surface of the housing. As an effect, waste modules may be inserted from the same side of the trolley into the respective module seatings. As a further effect, the top openings may be arranged in parallel at the top surface of the housing. This allows a simple and quick waste separation during collection of waste.

According to a further embodiment of the trolley, the main waste chamber is separated from the module seatings by a separating wall, which extends through the inside space of the trolley. As an effect, the main waste chamber may be protected. This protection may advantageously relate to the usage of the trolley, for instance, if a waste module is roughly inserted into a waste seating. Furthermore, said separating wall may form a back side wall for the at least one module seating and/or may form a back surface limiting the receiving space of said at least one waste module.

According to a further embodiment of the trolley, the main waste chamber extends to the top surface of the housing, wherein the housing comprises a main opening at the top surface for inserting waste into the main waste chamber. Thus, in order to collect waste in the main waste chamber, waste may be inserted through said main opening at the top surface of the housing.

According to an exemplary embodiment of the trolley, the housing is configured to releasably attach a waste bag in the main waste chamber, in particular such that a bag opening of the waste bag is coaxial arranged with the main opening. As a result, waste inserted through the main opening will at the same time be inserted through the bag opening into the waste bag.

According to a further embodiment of the trolley, a main lid is pivotably connected to a top section of the housing. For this purpose, a bearing may be provided, such that the main lid is pivotably connected by the bearing to the top section of the housing. Furthermore, the bearing may be configured to allow a rotation of the lid between an opened position and a closed position. In the closed position, the main lid covers at least the main opening. According to an exemplary embodiment, the main lid may be configured, to cover the main opening and the at least one top opening, if the main is in the closed position. Thus, the main lid may be used to cover the main opening for inserting waste into the main waste chamber as well as the top openings, which are used to insert waste into the at least one waste module, if being received by the at least one module seating. Furthermore, the main lid in its opened position uncovers the main opening and/or the at least one top opening. For this purpose, the main lid in its opened position may be rotated about a horizontal axis provided by the bearing, such that it is in contact with a lateral and/or backside wall of the housing. The main lid in its opened position may be releasably attached and/or fixed to said lateral and/or backside wall of the housing. Being in its opened position, the main lid uncovers said main and/or top openings, such that waste may be collected.

According to a further embodiment of the present invention, a further lid, which may also be referred to the seating lid, is provided, which is pivotably connected to the top section of the housing. For this purpose, a separate bearing may be provided. Thus, the further lid may be pivotably connected by said further bearing to the top section of the housing. The further lid may be pivotable between an opened position and a closed position. In its closed position, the further lid may cover the at least one top opening. In its opened position, the further lid may uncover the at least one top opening. As a result, different lids may be assigned to the main opening and the at least one top opening.

According to a further embodiment of the trolley, the trolley comprises a door, which is pivotably connected to the housing, such that the door may be pivoted between an opened position and a closed position. The door closes the side surface of the housing at least partly, if the door is in the closed position. The door opens the side surface to the environment, if the door is in the opened position. Said side surface preferably relates to the front surface housing. Further, the at least one side opening is provided at said side surface, wherein the at least one side opening serves as a side opening for the at least one module seating. The door may be pivoted to the closed position, in order to cover said at least one side opening at least partly. In case a waste module is inserted into a module seating, the door may prevent an environmental contact to said waste module. Furthermore, the door may be releasably locked, if it is in the closed position. Thus, the door may even further prevent that a waste module drops out unexpectedly. According to an exemplary embodiment, the door in its closed position just covers said side surface and/or said at least one side opening partly. Thus, the door may be formed by a latch. Furthermore, if the door is in its opened position, the side surface and/or the at least one side opening are released to the environment. Thus, a waste module may be inserted into the at least one module seating or removed therefrom. Further preferred, the door may be pivotably connected by a further bearing to a lateral sidewall of the housing. The further bearing may be configured, such that the door may be pivotable about a vertical axis.

According to a further embodiment, the door comprises a recess. The recess may provide an access to the at least one side opening, even if the door is in its closed position. Thus, the door may cover the side surface and/or each of the at least one side openings except for the recess, if the door is in its closed position. As a result, the door may fully cover the side surface and/or the side openings except for the recess. The recess may be configured and/or used to operate the at least one waste module, which may be received in the at least one module seating.

Certain advantages are provided by a waste module according to claim 8. Advantageous embodiments and/or further improvements may be gathered from the respective sub-claims and/or from the following description.

A waste module for collecting waste is proposed comprising a module housing, which comprises at its top surface a top opening for inserting waste, and a module waste chamber for receiving waste inserted through the top opening. The module housing of the waste module comprises second connection means at its outside surface, which are configured to releasably interact with first connection means of a trolley for collecting waste.

The waste module relates to a separately handable unit and/or device, in particular for this purpose, the waste module comprises the module housing. The module housing may be formed by a frame. This frame may also refer to as a module frame. The module housing is configured to provide a top surface with a top opening. Thus, waste may be inserted through the top opening of the module housing. Waste inserted through the top opening may be directly or indirectly arrive at the module waste chamber of the waste module. The module waste chamber is therefore configured to collect and/or receive waste inserted through the top opening. The module waste chamber may be formed by a container. This container may also refer to as a module container. The container of the waste module may be attached to the module housing. The container may comprise fluid tight walls. Preferably, the container is releasably attached to the module housing. Furthermore, the waste module is preferably configured to be releasably coupled to a module seating of a trolley. For this purpose, second connection means are provided by the module housing. The second connection means are arranged at an outside surface of the module housing, such that they may automatically engage with first connection means of the trolley. In particular, the trolley comprises a module seating with said first connection means. Thus, when inserting the waste module into the module seating of the trolley, the second connection means of the waste module may automatically engage with the first connection means of the module seating, in order to provide a releasable connection for coupling the waste module to the module seating of the trolley.

A waste module provides the advantage, that the waste module may be individually configured to a specific waste collection purpose. For instance, the waste module may be specifically configured for collecting liquid, cans or cups. Thus, using a specifically configured waste module for a trolley provides the advantage that depending on the waste to be collected, a selection of specifically configured waste modules may be used to be inserted into the at least one module seating of the trolley. As an effect, a system provided by the trolley and the waste module allows to collect waste and at the same time allows to separate different types of waste. For instance, one waste module may be configured for collecting liquids, wherein a further waste module may be configured for collecting cans and/or an even further waste module may be configured for collecting cups. Further, even if a module waste chamber of one of the waste modules is filled up with the respective type of waste, the usage of the trolley may be re-established by exchanging the respective waste module with a new correspondingly configured waste module. Alternatively, a module container of the respective waste module may be exchanged. Thus, by exchanging just a waste module or its container, the collection of waste via said system may be continued. The exchanged waste module or the exchanged module container may be stored in a particular space, for instance in the galley of an aircraft.

Moreover, the modules themselves may be designed in a way to stack them in a space efficient way while stored outside of the trolley (e.g. at the catering or cleaning company).

According to an exemplary embodiment of the waste module, the waste module is configured as a liquid waste module. Thus, the waste module may also be referred to as the liquid waste module. The liquid waste module comprises at its top section a funnel. The funnel forms a top opening of the module housing of the liquid waste module. The funnel may be connected to the module housing and/or assigned thereto. Further, the funnel is connected, in particular directly or indirectly, to the module waste chamber. The module waste chamber is arranged below the funnel, such that liquid inserted into the funnel flows, in particular directly or indirectly, into the module waste chamber of the liquid waste module. As a result, the waste module configured as the liquid waste module allows to separately collect liquid waste, if the waste module is used for the trolley, and thus may be received by the at least one module seating of the trolley. Further, the module waste chamber may be formed by a module container of the liquid waste module. The module container is, in particular releasably, connected to the housing of liquid waste module.

Liquids are usually not compressible. Thus, collecting waste in the module waste chamber of the liquid waste module allows to keep uncompressible waste away from the main waste chamber of the trolley and/or other module waste chambers of further waste modules. Thus, further waste collected in the main waste chamber and/or in other module waste chambers may comprise waste, which may be compacted. As a result, the efficiency of compacting waste when using a trolley with the liquid waste module may be increased. As a further effect, an advantageous waste separation may be provided by using the liquid waste module. Depending on the quantity of liquid waste expected to be collected, even more than one liquid waste module may be received by the at least one module seating of the trolley. Thus, due to the module character of the liquid waste module, the capacity for collecting liquid waste may be selectively increased by the number of liquid waste modules inserted into the at least one module seating of the trolley. Further, the handling of liquid waste by means of a liquid waste container may be simplified.

According to an exemplary embodiment of the liquid waste module, a check valve is arranged between the funnel and the module waste chamber of the liquid waste module. The check valve is configured to pass liquid from the funnel to the module waste chamber and is configured to block liquid to pass in an opposite direction. The check valve may be integrated in a connection line extending from the funnel to the module waste chamber. Thus, the check valve effectively prevents a dropout of liquid already collected in the module waste chamber.

According to a further embodiment of the liquid waste module, the module container preferably forming the module waste chamber is formed by a liquid-tight tank. The tank may be releasably connected to the module housing of the liquid waste module. Thus, if the tank is filled up with the collected liquid, the tank may be exchanged by a new (empty) tank.

According to a further embodiment of the liquid waste module, instead of a check valve, a baffle plate may be provided, which extends into a liquid connection line extending between the funnel and the module waste chamber. The baffle plate may be arranged and/or configured to prevent a spurt out of collected liquid through the funnel into the environment.

According to an exemplary embodiment of the waste module, the waste module is configured as a can waste module. Thus, the waste module may also be referred to as the can waste module. The can waste module comprises a can crusher unit and a can container. The can crusher unit comprises a can opening for inserting a can into the can crusher unit, wherein the can opening forms the top opening of the module housing of the can waste module. The can crusher is configured to crush a can. Further, the can crusher is configured to release a crushed can via a release opening, which is connected, in particular directly or indirectly, to the can container. The can container forms the module waste chamber of the can waste module, such that crushed cans may be collected in the can container. As a result, the can waste module may be specifically configured for crushing and collecting crushed cans. A can preferably relates to a cylindrical container. Further preferably, the can is a beverage can. Thus, the can may be configured to hold a fixed portion of liquid, such as carbonated soft drinks, alcoholic beverages, fruit juices, teas, herbal teas, energy drinks, etc. The liquid can be consumed by a human, for instance during a flight. The can as such thus may be a specific type of waste. Further preferred, the can may relate to a metal can, in particular to an aluminium can. The can usually has a cylinder wall, which provides a high form stability in an axial direction of the can. Accordingly, high forces may be needed in order to crush a can to be compacted thereafter. Consequently, if a can would be collected by a waste bag, a compaction of the waste bay would very likely fail to compact the form stable can. However, the can waste module is specifically configured via its can crusher to crush a can. Crushing a can thus may relate to a compaction of the can. Thus, the can waste module provides the advantage that cans as waste may be crushed and collected as compacted waste. As a result, if the expected waste to be collected, for instance in a cabin of an aircraft, comprises cans, the can waste module may form at least one waste module, which is to be received by a module seating of the trolley. As a further result, the cans may be separated from further waste during waste collection, which effectively allows to recycle collected cans.

Preferably, the can crusher of the can waste module is connected to the module housing of the can crusher module. Furthermore, the can container of the can waste module may be mechanically connected to the module housing of the can waste module. However, it is preferred, that the can container may be releasably connected to the module housing. As a result, the can container may be exchanged, if the can container is filled up with crushed cans. Furthermore, it is preferred that the can container is arranged below the can crusher. Thus, a crushed can may be released through the release opening of the can crusher in order to slide into the can container. For this purpose, a channel may be provided by the can waste module extending from the release opening of the can crusher to a container opening of the can container. The container opening is preferably arranged at a top section of the can container.

The can crusher is preferably arranged at a top section of the can waste module. Thus, the can opening provided by the can crusher preferably forms the top opening of the module housing. Accordingly, a can to be collected may be inserted from an environment through the can opening into the can crusher. The can opening preferably provides an opening to a crushing chamber of the can crusher. Thus, an inserted can may be fully received by the crushing chamber. The can crusher is configured to crush a can. Thus, the can crusher may be configured to crush a can received in the crushing chamber. The can crusher may comprise a compaction unit, which is configured to crush and/or compact the can inserted into the crushing chamber. Generally, the compaction unit may be a motorized driven compaction unit. However, the compaction unit may also be configured to be a hand craft driven compaction unit and/or foot craft driven compaction unit.

A crushed can may be released from the can crusher via the release opening towards the can container. For this purpose, the release opening may provide a form and/or a size, which allow to pass a crushed can and which prevents to pass an uncrushed can. In other words, the release opening may be formed, such that an uncrushed can will not fit through the release opening. The release opening may form an opening at a bottom section of the crushing chamber. Thus, a crushed can in the crushing chamber may automatically slide through the release opening towards the can container. The can container may be a tank and/or any other type of container which allows to collect crushed cans. Preferably, the can container is liquid-tight and/or provides a form stability.

According to an exemplary embodiment of the can waste module, the housing of the can waste module comprises a container seating. The container seating is configured to receive and releasably fasten the can container. Thus, the can container may be an exchangeable can container. For instance, if the can container is filled up with crushed cans, the can container may be released from the container seating. The can container filled up with crushed cans may be stored at a specific space, in particular at the galley of an aircraft. Moreover, a new can container may be engaged with the container seating, such that the new can container is received by the container seating and releasably fasten thereto. For releasably fasten a can container to the container seating, the can container and the container seating may comprise correspondingly adapted connection means. As a result, the can crusher of the can waste module may be used during the collection of can in connection with a plurality of can containers. Since the can containers may be easily handable, the collection of cans may be enhanced. As a further effect, less space for storing collected cans may be needed. This is of particular advantage, if the can waste module is used during the collection of cans in a cabin of an aircraft.

According to a further embodiment of the can waste module, the can crusher unit comprises a crushing chamber. The top opening of the module housing of the can waste module forms a, in particular top, opening of the crushing chamber, such that a can to be crushed can be inserted into the crushing chamber. The can crusher unit further comprises a stamp, which is guided by a bearing to be movable between a receiving position, where a can to be crushed may be inserted into the crushing chamber, and a compression position, where the stamp extends into the crushing chamber for crushing a can. The release opening forms a further opening of the crushing chamber. The release opening is configured to pass a crushed can into the can container and to retain an uncrushed can in the crushing chamber. As a result, a can to be crushed may be inserted into the crushing chamber via the top opening, if the stamp of the can crusher is in its receiving position. The uncrushed can inserted into the crushing chamber retains in the crushing chamber, since the release opening is configured to just pass crushed cans. Thus, the uncrushed can received by the crushing chamber may be crushed by the stamp. For this purpose, the stamp is moved to its compression position, where the stamp extends into the crushing chamber and thereby crushes the can received in the crushing chamber. Thereafter, the stamp can be moved to the receiving position. The crushed can arranged in the crushing chamber has now smaller outer dimensions, such that the crushed can will pass the release opening towards the can container.

Further preferably, the stamp of the can crusher may be motorized driven. For this purpose, the can waste module may comprise an electromechanical driving unit and an electrical energy storing unit, which is connected to the drive unit in order to provide necessary energy. However, it is preferred that the stamp of the can crusher may be hand force driven and/or foot force driven. For this purpose, the can waste module may be respectively configured.

According to a further embodiment of the can waste module, the can waste module comprises a lever and a mechanical linkage. The lever is linked to the stamp via the mechanical linkage, such that the stamp may be operated via the lever. Preferably, the lever is formed by a foot pedal. Thus, operating the foot pedal via a foot may provide a respective force and/or mechanical moment to the mechanical linkage, which transmits this force and/or mechanism moment to the stamp. Thus, the lever and the mechanical linkage may be configured, such that the stamp may be moved between its receiving position and compression position via operating the lever, in particular formed as a foot pedal. Further preferably, the mechanical linkage, the stamp and/or the foot pedal is configured to automatically move the stamp into the receiving position. For instance, the stamp, the mechanical linkage and/or the lever may be subject to a spring force, which forces the stamp to be autonomously moved to the receiving position. Against this spring force, the lever, in particular formed by the foot pedal, may be operated to move the stamp to the compression position. As a result, the stamp of the can crusher may be operated without electrical energy and/or without a motorized driving unit. Consequently, the can crusher as such and therefore the can waste module may be of low technical complexity.

Preferably, the foot pedal is arranged within a pedal space of the module housing of the can waste module. The pedal space may be arranged at a bottom section of the can waste module and/or the module housing of the can waste module. Furthermore, the pedal space preferably comprises a side opening, which forms a respective opening in the can waste module and/or the module housing of the can waste module. Thus, the pedal space and therefore the foot pedal may be accessible via the side opening to the environment. As a consequence, after inserting a can to be crushed into the crushing chamber, the foot pedal may be operated by foot which is accessed through the side opening into the pedal space in order to press and/or push the foot pedal. The respective force and/or mechanical moment resulting therefrom may be transmitted via the mechanical linkage to the stamp which results in a movement of the stamp from the receiving position to the compression position. As a consequence, the can inserted into the crushing chamber will be crushed. Releasing the foot from the foot pedal will result in an autonomous movement of the stamp to the receiving position. Thereafter, the crushed can will pass through the release opening towards the can container.

According to a further embodiment of the can waste module, the lever may be a hand-driven lever. Thus, instead of a foot pedal, the lever may be operated by hand force. It is to be understood that, without repeating here all the examples and explanations provided with regard to the foot pedal, the lever configured as a hand-driven lever is intended as being configured in an analogous manner. Thus, all the above provided examples, explanations and/or effects may be intended as being implemented for the hand-driven lever in an analogous manner.

According to a further embodiment of the waste module, the waste module is configured as a cup waste module. The module waste chamber of the cup waste module is preferably formed by a cup container, preferably comprising a cylindrical receiving space. In particular, the cup container is formed by a hollow, cylindrical container. Thus, a cup inserted through the top opening into the module waste chamber may slide into and/or within the hollow, cylindrical container. The top opening and or the hollow, cylindrical container may be configured for a predefined cup size. Further, the top opening may be configured to be adapted for different, in particular predefined different, cup sizes. The hollow, cylindrical container prevents a pivoting or rotation about an axis in radial direction of the cup. In other words, the cup sliding into and/or within the hollow, cylindrical container may remain its basic orientation. As a result, cups collected via the cup waste module may be stacked within the hollow, cylindrical container, in particular autonomously. Furthermore, inserting further cups into the cylindrical receiving space of the cup container will allow a manual compaction of the stack of previously collected cups in the cup container. Furthermore, left-over liquids in a cup may be inserted beforehand into the funnel of the liquid waste module. Thus, an effective separation of waste may also be provided using the cup waste module.

Preferably, the cup container of the cup waste module is connected, preferably releasably connected, to the module housing of the cup waste module. As a result, the cup container may be exchanged, in particular if the cup container is filled up with collected cup. Furthermore, the module housing of the cup waste module preferably comprises a pivotable flap. The flap is arranged at the top section of the module housing. Thus, the flap may be pivotable about a horizontal axis of a respective bearing of the module housing. Further, the flap may be configured to provide the top opening of the module housing. Moreover, the flap may be pivotable between an opened position and a closed position. In its closed position, the flap may be connected to the cup container, in particular such that the cup container is releasably fixed and/or releasably secured by the flap. In its closed position, the top opening provided by the flap is arranged, such that cups may be inserted in order to pass to the cup container. In its opened position, the flap may be pivoted, such that the cup container is released from the flap. Thus, the cup container may be detached form the module housing of the cup waste module, in particular to be exchanged.

Certain advantages are also provided by a system according to claim 15. The system comprises a trolley for collecting waste. The trolley relates to a trolley according to the first aspect of the present invention and/or its preferred embodiments. Furthermore, the system comprises at least one waste module, in particular in according to the second aspect of the present invention and/or its preferred embodiments. Each waste module is received by the at least one module seating of the trolley. Further, each waste module is releasably connected to the at least one of the module seatings. It is understood, all the above examples and/or explanations, although previously provided with reference to the trolley and/or the waste module, are also to be intended as being implemented by the system. Thus, all the above examples, explanations, features and/or advantages, preferably provided with reference to the trolley and/or the waste module, are also to be intended as being preferably provided in an analogous manner for the system.

According to an exemplary embodiment of the system, the system comprises one trolley and at least two waste modules. The waste modules are preferably different waste modules. The waste modules may be at least two of the following waste modules: liquid waste module, cup waste module and can waste module. According to an example, the system may comprise a can waste module and a cup waste module. According to a further example, the system may comprise a can waste module and a liquid waste module. According to a further example, the system may comprise a can waste module, a cup waste module and a liquid waste module. Further preferred, the waste modules may be collectively and/or individually received by the at least one module seating of the trolley.

Certain advantages are also provided by a trolley for collecting waste, comprising: a housing, which comprises a main waste chamber for receiving waste, and wheels, which are attached to a bottom wall of the housing, wherein the housing comprises at least one module seating, wherein each module seating is configured to receive a waste module for collecting waste, and wherein each module seating comprises fasteners, which are configured to releasable couple a waste module.

According to an exemplary embodiment of the trolley, each module seating forms a receiving space to at least partly or fully receive a waste module.

According to a further embodiment of the trolley, each module seating comprises first connection means at its inside surface, which are configured to releasably interact with second connection means of a waste module.

According to a further embodiment of the trolley, each module seating extends to a side surface of the housing, wherein each module seating comprises a side opening at the side surface of the housing, such that a waste module may be inserted through the side opening into the respective module seating.

According to a further embodiment of the trolley, each module seating extends to a top surface of the housing, wherein each module seating comprises a top opening at the top surface of the housing, such that waste may be inserted through the top opening.

According to a further embodiment of the trolley, the housing of the trolley comprises a plurality of module seatings, which are arranged in parallel, such that the top-openings and/or side openings are arranged in parallel.

According to a further embodiment of the trolley, the trolley comprises a door, which is pivotably connected to the housing, such that the door may be pivoted between an opened position and a closed position, wherein the door closes the side surface of the housing at least partly, if the door is in the closed position, and wherein the door opens the side surface to the environment, if the door is in the opened position.

Certain advantages are also provided by a waste module for collecting waste, comprising: a module housing, which comprises at its top surface a top opening for inserting waste, and a module waste chamber for receiving wasted inserted through the top opening, wherein the module housing comprises second connection means at its outside surface, which are configured to releasably interact with first connection means of a trolley for collecting waste.

According to an exemplary embodiment of the waste module, the waste module is configured as a liquid waste module, wherein the waste module comprises at its top section a funnel, which forms the top opening of the module housing of the waste module, and wherein the funnel is connected to the module waste chamber, arranged below the funnel, such that liquid inserted into the funnel flows into the module waste chamber of the waste module.

According to a further embodiment of the waste module, a check valve is arranged between the funnel and the module waste chamber of the waste module, wherein the check valve is configured to pass liquid from the funnel to the module waste chamber and blocks liquid to pass in an opposite direction.

According to a further embodiment of the waste module, the waste module is configured as a can waste module, wherein the waste module comprises a can crusher unit and a can container, wherein the can crusher unit comprises a can opening for inserting a can into the can crusher unit, wherein the can opening forms the top opening of the module housing of the waste module, wherein the can crusher unit is configured to crush a can, wherein the can crusher unit is configured to release a crushed can via a release opening, which is connected to the can container, and wherein the can container forms the module waste chamber of the waste module, such that crushed cans may be collected in the can container.

According to a further embodiment of the waste module, the module housing of the waste module comprises a container seating, which is configured to receive and releasably fasten the can container.

According to a further embodiment of the waste module, the can crusher unit comprises a crushing chamber, wherein the top opening of the module housing of the waste module forms an opening of the crushing chamber, such that a can to be crushed may be inserted into the crushing chamber, wherein the can crusher unit comprises a stamp, which guided by a bearing to be movable between a receiving position, where a can to be crushed may be inserted into the crushing chamber, and a compression position, where the stamp extends into the crushing chamber for crushing a can, wherein the release opening forms a further opening of the crushing chamber, and wherein the release opening is configured to pass a crashed can to the can container and to retain an uncrushed can in the crushing chamber.

According to a further embodiment of the waste module, the waste module comprises a lever and a mechanical linkage, wherein the lever is linked to the stamp via the mechanical linkage, such that the stamp may be operated via the lever.

Certain advantages are also provided by a system for collecting waste, comprising: a trolley, in particular according one of the preceding aspects and/or embodiments, and a waste module, in particular according to one of the preceding aspect and/or embodiments, wherein the waste module is received by the at least one module seating and releasably connected thereto.

These and other aspects of the present invention will become apparent from and be elucidated with reference to the embodiments described hereinafter.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Exemplary embodiments of the invention will be described in the following with reference to the following drawings.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In the following, the invention may be exemplarily described with reference to a trolley as such and/or a waste module as such. However, it is understood, all the following examples and/or explanations, although in particular provided with reference to the trolley and/or the waste module, are also to be intended as being implemented by a system. Thus, all the following examples, explanations, features and/or advantages, provided with reference to the trolley and/or the waste module, are also to be intended as being preferably provided in an analogous manner for the system.

Figure 1:
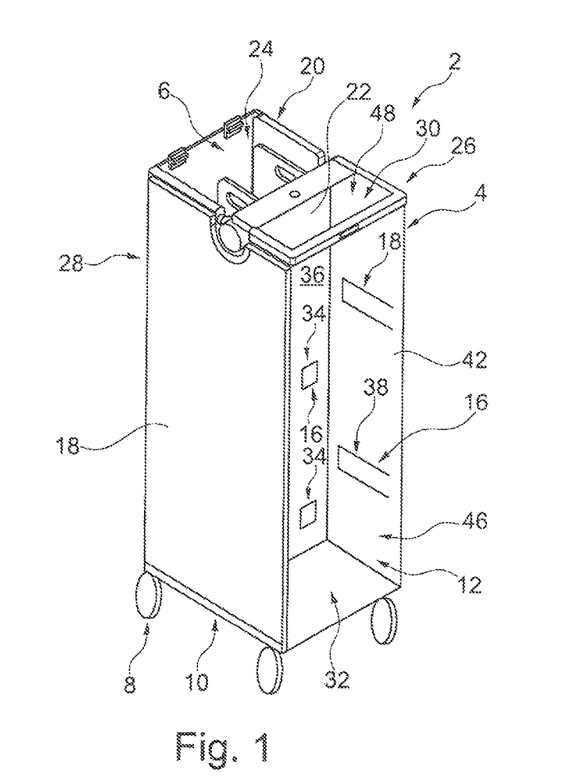
FIG. 1 schematically illustrates an example of the trolley in a perspective view.

FIG. 1 schematically illustrates an exemplary embodiment of the trolley 2 in a perspective view. The trolley 2 is used for collecting waste. The trolley 2 comprises a housing 4. The housing 4 comprises a bottom wall 10. Further, two opposite arranged side walls 18 extend from lateral edges of the bottom wall 10 towards a top surface 20 of the trolley 2. A separating wall 22 is arranged within the housing 4 of the trolley 2. The separating wall 22 also extends from the bottom wall 10 towards the top surface 20 of the trolley 2.

Further, the separating wall 22 extends between inside surfaces of the side walls 18. As a result, the separating wall 22 is configured and/or arranged within the housing 4 of the trolley 2, such that the separating wall 22 separates the inside space of the trolley 4 into two chambers. One of these chambers relates to a main waste chamber 6 of the housing 4. Preferably, the main waste chamber 6 of the trolley 2 encompasses at least 40%, at least 50%, at least 60% or even at least 70% of the inside space of the trolley 4. Preferably, the main waste chamber 6 encompasses between 40 and 60% of the inside space of the trolley 4. The main waste chamber 6 may be configured for receiving residual waste. The main waste chamber 6 extends from the bottom wall 10 to the top surface 20 of the trolley 4. The housing 4 preferably comprises a main opening 24 at the top surface 20 for the main waste chamber 6, such that waste may be inserted into the main waste chamber 6 through the main opening 24.

The trolley 2 comprises wheels 8, which are attached to the bottom wall 10 of the housing 4, such that the trolley 2 may be driven. The trolley 2 is preferably a mobile waste trolley. Further preferred, the trolley 2 is an aircraft waste trolley, which may have a standard size, in particular being configured as a half size trolley or a full size trolley. For steering the trolley 2, the trolley 2 comprises a handle 26. The handle 26 is connected to the housing 4 of the trolley 2. The handle 26 is arranged at a top section 28 of the housing 4.

The housing 4 of the trolley 2 comprises at least one module seating 12. The module seating 12 may also be referred to as a casing or a shaft. As the at least one module seating 12 is a part of the housing 4, the housing 4 forms the at least one module seating 12. As described before, the separating wall 22 divides the inside space of the housing 4 into the main waste chamber 6 and a remaining chamber 30. The remaining chamber 30 therefore may relate to a space within the housing 4, which is assigned to the at least one module seating 12. Thus, the at least one module seating 12 forms a receiving space 32, which is provided by at least a part of the further chamber 30.

According to a preferred embodiment of the trolley 2, the housing 4 comprises a single module seating 12. This preferred embodiment is exemplarily shown in FIG. 1. However, according to a further preferred embodiment of the trolley 2, the housing 4 may comprise more than one module seating 12, namely a plurality of module seatings 12, as it is exemplarily shown in FIG. 2. It is to be understood that preferred features, preferred embodiments and/or effects, which may be described in the following with reference to the single module seating 12 may also relate in an analogous manner to each of the plurality of module seatings 12.

The module seating 12, as it is exemplarily shown in FIG. 1, is configured to receive a waste module 14. The waste module 14 is exemplarily shown in FIG. 3, wherein the waste module 14 is received by the module seating 12. As can be taken from FIG. 3, the module seating 12 may be configured to receive more than one waste module 14, for instance two or three waste modules 14. Each of the waste modules 14 is configured for collecting waste.

Furthermore, and as it is exemplarily shown in FIG. 1, the module seating 12 comprises fasteners 16, which are configured to releasably couple the at least one waste module 14. The fasteners 16 may be formed by first connection means 34, which are arranged at the separating wall 22. The separating wall 22 may form an inside surface 36 of the module seating 12 and/or of its receiving space 32. The first connection means 34 are preferably configured to releasably interact with second connection means of a waste module 14. The fasteners 16 of the module seating 12 may further comprise at least one rail 38. The at least one rail 38 is preferably arranged at a lateral inside surface of the module seating 12. Thus, the at least one rail 38 may be arranged and/or attached to an inside surface of the at least one side wall 18 of the housing 4 limiting the receiving space 32.

Figure 3:
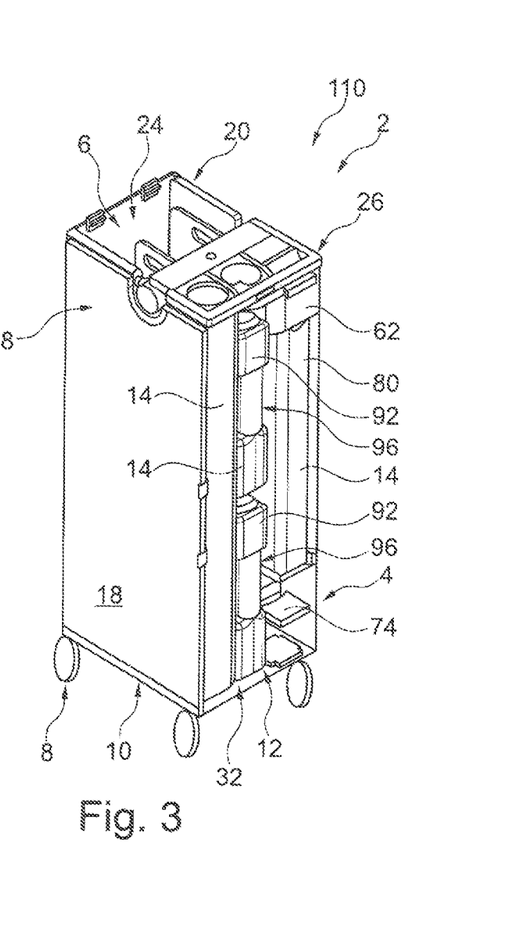
FIG. 3 schematically illustrates a further example of the trolley in a perspective view.

If a waste module 14 is inserted into the receiving space 32 of the module seating 12, the respective waste module 14 is at least partly, and preferably fully, received by the waste module 12, as it is exemplarily shown in FIG. 3. During receiving the waste module 14 by the module seating 12, the second connection means of the waste module 14 may engage with the first connection means 34 of the module seating 12, such that a releasable connection is established between the module seating 12 and the waste module 14. As a result, the module seating 12 and/or the waste module 14 are each configured to releasably couple to each other. Furthermore, outside extending pins 98 (see FIG. 11 or 12) at a lateral surface of the waste module 14 may engage with the rails 38 of the module seating 12. This will further serve for connecting the waste module 14 and the module seating 12 in a form-fit manner. Furthermore, by means of the pins 98 and the rails 38, the waste module 14 may be guided when inserting the waste module 14 into the module seating 12, such that the first connection means of the module seating 12 and the second connection means of the waste module 14 securely interact releasably with each other.

In order to releasably couple a plurality of waste modules 14, the module seating 12 may be configured to comprise fasteners 16 for each waste module 14. Thus, the module seating 12 may comprise a pair of connection means 34 for each of the waste modules 14. Thus, each of the waste modules 14 may be securely coupled and/or connected to the module seating 12. If more than one waste module 14 is received by the module seating 12, the waste modules 14 may be arranged in parallel in the receiving space 32 of the module seating 12.

Figure 2:
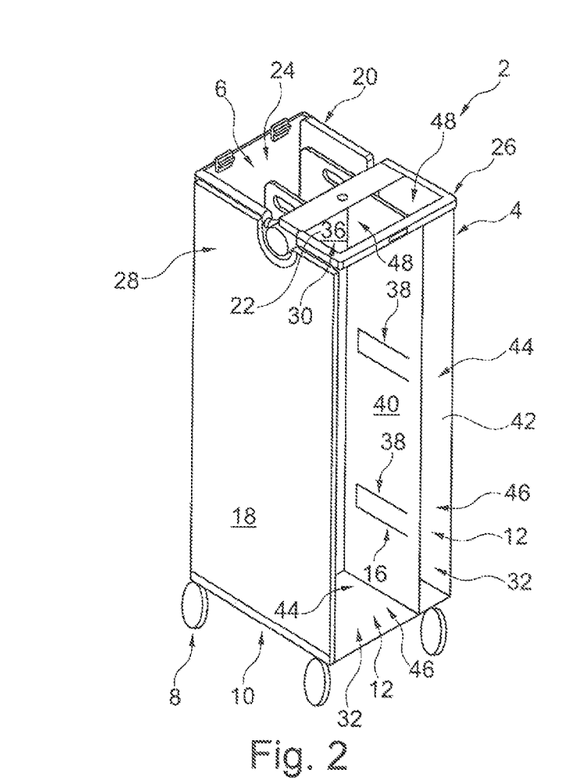
FIG. 2 schematically illustrates a further example of the trolley in a perspective view.

FIG. 2 shows a further preferred embodiment of the trolley 2, wherein the further chamber 30 provided by the housing 4 is divided by a further separating wall 40. The further separating wall 40 extends from the bottom wall 10 of the housing 4 to an upper surface 20 of the housing 4. Alternatively, the further separating wall 40 may extend partly between the bottom wall 10 and the upper surface 20. Moreover, the further separating wall 40 extends from the separating wall 22 towards a side surface 42, wherein said side surface 42 relates to a front surface of the trolley 2 and/or its housing 4. Preferably, the further separating wall 40 fully extends between the separating wall 22 and the front surface 42. The further separating wall 40 separates the further chamber 30 into sub-chambers 44. Each of the sub-chambers 44 may form a receiving space of a module seating 12. As a result, the housing 4 of the trolley 2 comprises a plurality of module seatings 12, namely depending on the number of respective further separating walls 44. Exemplarily shown in FIG. 2 is one further separating wall 40. Thus, the housing 4 shown in FIG. 2 comprises two module seatings 12. However, at least one further separating wall 40 may be provided in an analogous manner, such that the further chamber 30 may be divided in a respective number of sub-chambers 44.

It is preferred, that, if the housing 4 comprises more than one module seating 12, namely a plurality of module seatings 12, each of the module seating 12 is configured to receive a single waste module 14. As a result, a waste module 14 received by such a module seating 12 may be securely retained in the module seating 12 and/or securely coupled thereto.

If the housing 4 comprises a plurality of module seatings 12, each module seating comprises fasteners 16, which are configured to releasably couple and/or connect a waste module 14. For this purpose, first connection means 34 may be provided for each module seating 12. These first connection means 34 may each time be arranged at a respective section of the separating wall 22. Furthermore, rails 38 may be provided for each module seating 12. For a module seating 12 arranged at a lateral section of the housing 4, the rails 38 may be arranged at the inside surface of a respective side wall 18 and/or at an opposite inside surface of the respective further separating wall 40.

As it is exemplarily shown in FIGS. 1 and 2, each module seating 12 extends to the side surface 42 of the housing 4. Further, each module seating 12 comprises a side opening 46 at said side surface 42 of the housing 4. If a plurality of module seatings 12 is provided by the housing 4, the respective side openings 46 may be arranged in parallel. The at least one side opening 46 thus forms an opening in the side surface 42 of the housing 4. As a result, a waste module 14 may be inserted through a side opening 46 into the respective module seating 12. If the module seating 12—as exemplarily shown in FIG. 1—is configured to receive a plurality of waste modules 14, each of the waste modules 14 may be inserted through the respective side opening 46 of the module seating 12. In case the housing 4 comprises the plurality of module seatings 12, a waste module 14 may be inserted into each of the module seatings 12 through the respective side opening 46.

Each module seating 12 is further configured to extend to the top surface 20 of the housing 4. Furthermore, each module seating 12 comprises a top opening 48 at the top surface 20 of the housing 4. Thus, each top opening 48 provides an opening in the top surface 20 of the housing 4. As a result, waste may be inserted through the at least one top opening 48. If a waste module is inserted into the module seating 12, waste may be inserted through the top opening 48 into the respective waste module 14. In case a plurality of waste modules 14 is inserted into a single module seating 12, the top opening 48 of the module seating 12 is configured to provide an opening for each of the waste modules 14 at the top surface 20 of the housing 4.

In case the housing 4 of the trolley 2 comprises a plurality of module seatings 12, as it is exemplarily shown in FIG. 2, the module seatings 12 are preferably arranged in parallel. As a result, the corresponding top openings 48 and/or the corresponding side openings 46 may also be arranged in parallel.

FIG. 3 shows the trolley 2 as it has been explained with regard to FIG. 1, wherein three waste modules 14 are received by the module seating 12. Each of the waste modules 14 have been inserted through the side opening 46 into the receiving space 32 provided by the module seating 12. The waste modules 14 are inserted into the module seating 12, such that the waste modules 14 are arranged in parallel in the receiving space 32. Furthermore, each of the waste modules 14 is fully received by said receiving space 32. As a result, none of the waste modules 14 extends above the outer dimensions of the trolley 4 and/or its side surface 42 and/or its top surface 20. Moreover, each of the waste modules 14 extends from the bottom wall 10 to the top opening 48. As a result, waste inserted through the top opening 48 may be at the same time inserted into one of the waste modules 14.

Figure 4:
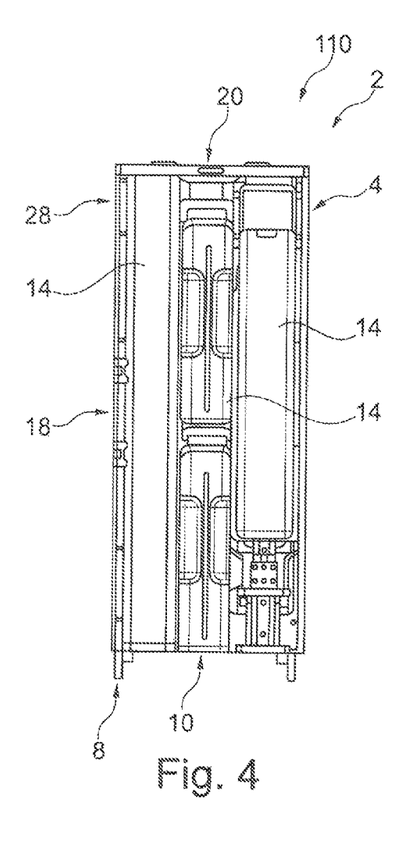
FIG. 4 schematically illustrates a further example of the trolley in a perspective view.

FIG. 4 schematically shows the exemplary embodiment of the trolley 2 of FIG. 3 in a side view. As can be taken from FIG. 4, the waste modules 14 may provide at least basically equal outer dimensions. Moreover, the dimensions of the waste modules 14 are configured, such that the receiving space 32 is filled with the plurality of waste modules 14. As a result, the waste modules 14 may also at least partly hold each other. Thus, the waste modules 14 may be securely arranged in the receiving space 32 of the module seating 12. As a further result, the position of the waste modules 14 may be exchanged between each other. Further, each waste module 14 may be exchanged by another waste module 14. Accordingly, it is preferred, that each waste module 14 at least basically comprises the same outer dimension. As a consequence, the module character of the waste modules 14 is enhanced.

Figure 5:
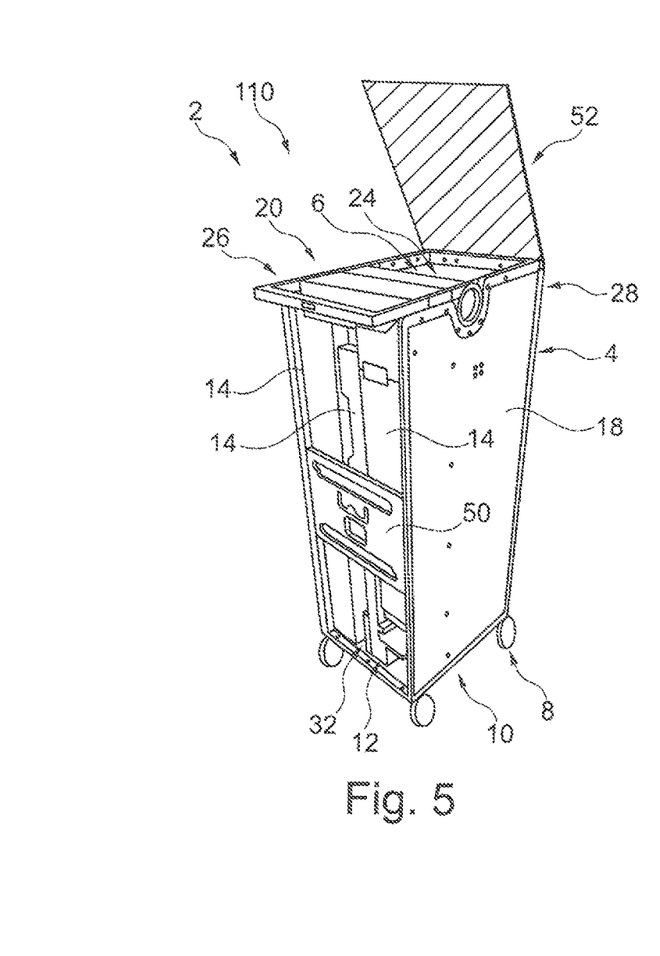
FIG. 5 schematically illustrates a further example of the trolley in a perspective view.

FIG. 5 schematically illustrates a further preferred embodiment of the trolley 2, which is similar to the trolleys 2 shown in FIGS. 1 and 3. However, the trolley 2 comprises a door 50. The door 50 may be formed as a hatch and/or slat. The door 50 is pivotably connected and/or pivotably mounted to the housing 4, such that the door 50 may be pivoted between an opened position and a closed position. The door 50 in its closed position is exemplarily shown in FIG. 5. The door 50 closes the side surface 42 of the housing 4 at least partly, if the door 50 is in its closed position. The door 50 opens the side surface 42 (in particular fully) to the environment, if the door 50 is in its opened position. The door 50 may be releasably fixed and/or locked to the housing 4, if the door 50 is in its opened position and/or in its closed position. Thus, as it is exemplarily shown in FIG. 5, the door 50 in its closed position effectively ensures that the at least one waste module 14 is securely kept in the receiving space 32 of the module seating 12. In other words, the door 50 may prevent an unexpected dropout of the at least one waste module 14 out of the module seating 12. In order to provide the pivotable connection between the door 50 and the housing 4, a bearing may be provided at an edge section of one of the side walls 18, which pivotably connects and/or mounts the door 50 with the housing 4. At the edge section of the opposite side wall 18 of the housing 4, fixing and/or locking means may be provided in order to releasably fix and/or lock the door 50, if the door 50 is in its closed position.

Further preferred, the trolley 2 may comprise a lid 52. The lid 52 is pivotably connected to the housing 4 at a top section of the housing 4, such that the lid 52 may be pivoted between an opened position and a closed position. The lid 52 may be pivotably connected to the top section of the housing 4 via a further bearing. Furthermore, the lid 52 may be configured to close the main opening 24 and/or the at least one top opening 48, if the lid 52 is in its closed position. If the lid 52 is in its opened position, the lid 52 may open the main opening 24 and/or the at least one top opening 48 to the environment.

Figure 6:
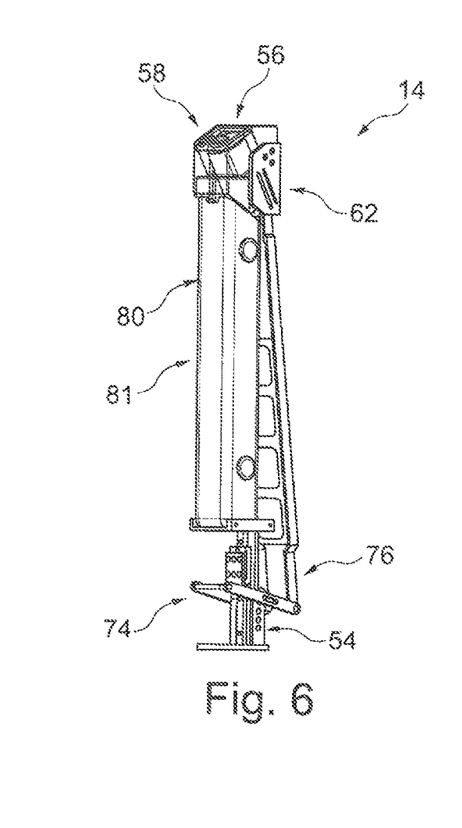
FIG. 6 schematically illustrates an example of the can waste module in a perspective view.

FIG. 6 schematically illustrates an embodiment of the waste module 14 in a perspective view. The waste module 14 is configured as a can waste module 14. The can waste module 14 comprises a module housing 54. Generally, the module housing 54 of a waste module 14, in particular configured as can waste module 14, is not necessarily configured to house and/or encompass further components. In particular, the module housing 54 of the waste module 14 may be formed as a frame. Thus, the module housing 54 may also refer to as a frame. The module housing 54 comprises at its top surface a top opening 58 for inserting waste.

Figure 7:
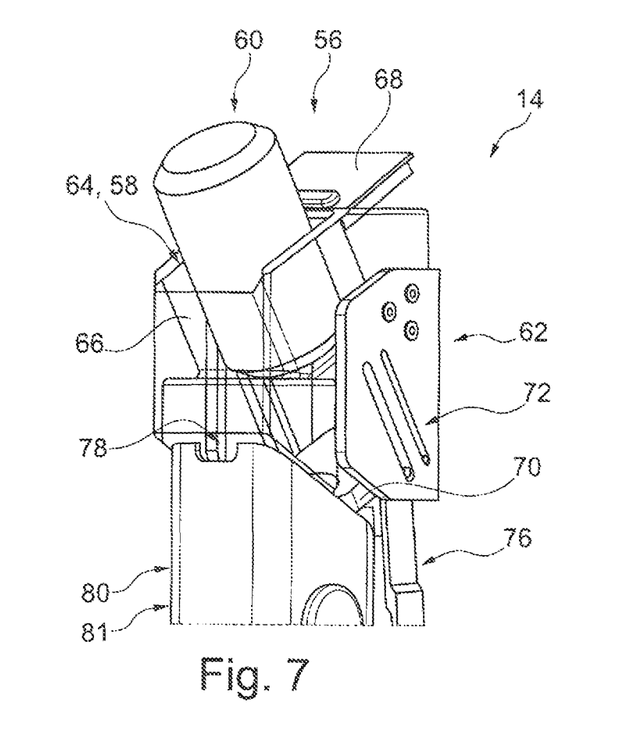
FIG. 7 schematically illustrates details of the can waste module in a perspective view.
Figure 8:
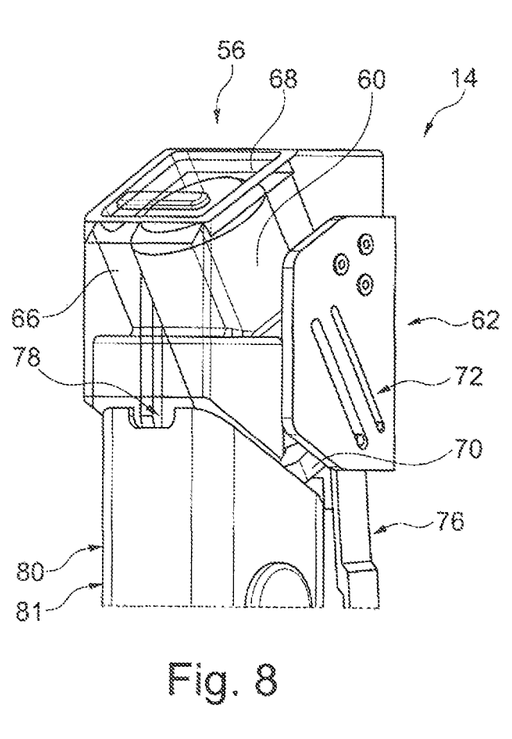
FIG. 8 schematically illustrates further details of the can waste module in a perspective view.

FIG. 7 exemplarily illustrates further details of the can waste module 14 shown in FIG. 6. As can be taken from FIG. 7, an uncrushed can 60 as an example of waste, in particular as a specific type of waste, may be inserted through the top opening 58 into the can waste module 14. The top opening 58 is provided by a can crusher unit 62 of the can waste module 14. The can crusher unit 62 is a part of the can waste module 14. The can crusher unit 62 is arranged at a top section of the can waste module 14. Further, the can crusher unit 62 is connected to the module housing 54, in particular formed as a frame. Moreover, the can crusher unit 62 comprises a can opening 64 forming the top opening of the can waste module 14. In this context, the can opening 64 relates to the top opening 58. Furthermore, the can crusher unit 62 comprises a crushing chamber 66. The can opening 64 forms an opening of the can crushing chamber 66. Thus, the uncrushed can 60 may be inserted into the crushing chamber 66 via the can opening 64. The can crusher unit 62 further comprises a can opening lid 68. The can opening lid 68 is movable connected to the can crusher unit 62, such that the can opening lid 68 can is moveable between an opened position and a closed position. Preferably, the can opening lid 68 is connected via a linear guide bearing to the can crusher unit 62 in order to be movable between the opened position and the closed position. FIG. 7 exemplarily shows the can opening lid 68 in an opened position. FIG. 8 exemplarily shows the can opening lid 68 in a closed position. If the can opening lid 68 is in its closed position, the can opening lid 68 covers the can opening 64. Furthermore, FIG. 8 illustrates that the uncrushed can 68 is fully inserted into the crushing chamber 66 of the can crusher unit 62. Thus, the crushing chamber 66 of the can crusher unit 62 may be formed and/or configured to fully receive an uncrushed can 60.

Furthermore, the can crusher unit 62 is configured to crush a can 60. For this purpose, the can crusher unit 62 preferably comprises a stamp 70. The stamp 70 is guided by a bearing 72. Said bearing 72 may also be referred to as the can crusher bearing 72. Preferably, the can crusher bearing 72 is configured to linearly guide the stamp 70 between a receiving position and a compression position. Thus, the can crusher bearing 72 may be configured as a linear guide or a linear guide bearing. Further, the stamp 70 is guided by the can crusher bearing 72 to be movable between the receiving position, where a can 60 to be crushed may be inserted into the crushing chamber 66, and the compression position, where the stamp 70 extends into the crushing chamber 66 for crushing the can 60.

As it is exemplarily shown in FIG. 6, the can waste module 14 preferably provides a foot pedal 74 and a mechanical linkage 76, wherein the foot pedal 74 is linked to the stamp 70 via the mechanical linkage 76, such that the stamp 70 may be operated via the foot pedal 74. Thus, the stamp 70 may be operated via the foot pedal and the mechanical linkage 76 in order to drive the stamp 70 from the receiving position to the compression position.

Figure 9:
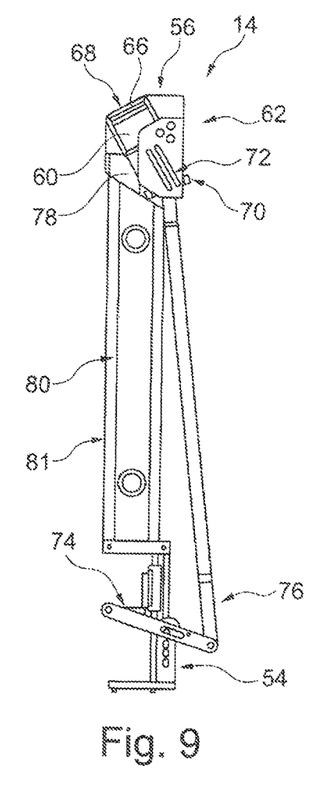
FIG. 9 schematically illustrates the can waste module in a cross-sectional view.

FIG. 9 schematically illustrates the can waste module 14 in a cross-sectional view. As can be taken from FIG. 9, an uncrushed can 60 is fully inserted into the crushing chamber 66, wherein the can opening lid 68 is moved to its closed position. The can opening lid 68 in its closed position therefore may be configured and/or function as a pressing plate being at least partly oppositely arranged to the stamp 70. If the foot pedal 74 is operated, such that the stamp 70 is moved from its receiving position to its compression position, the can 60 will be crushed between the stamp 70 and the compressing plate provided by the can opening lid

Figure 10:
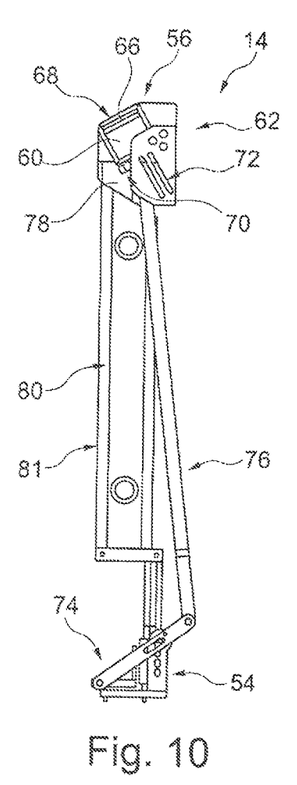
FIG. 10 schematically illustrates the can waste module in a further cross-sectional view.

68, as it is schematically shown in FIG. 10. As a result, the can 60 is compacted and now comprises a reduced outer dimension. If the foot pedal 74 is released, the stamp 70 may be retraced to the receiving position via a spring force. For this purpose, a spring (not shown) may be connected from the housing 54 to the foot pedal 74, the mechanical linkage 76 and/or the stamp 70, such that the respective spring force moves the stamp 70 independently back to the receiving position. The crushed can 60 in the crushing chamber 66 may be released through a release opening 78. The release opening 78 provides a further opening of the crushing chamber 66. However, the release opening 78 is preferably arranged at a bottom section of the crushing chamber 66. The opening provided by the release opening 78 is preferably configured, such that an uncrushed can is retained in the crushing chamber 66. Thus, the dimension and/or size of the release opening 78 is preferably smaller than the outer dimension of an uncrushed can 60. However, the dimensions and/or size of the release opening 78 may be configured to allow a crushed can 60 to be passed. The opening may be configured to be suitable for different can sizes. Thus, after releasing the foot pedal 74, the stamp 70 is moved to the receiving position 70, while at the same time the crushed can will follow the stamp 70 in an analogous movement. At the latest if the stamp 70 reaches the receiving position, the crushed can 60 falls through the release opening 78 towards or into a waste chamber 80 of the can waste module 14. The waste chamber 80 of the can waste module 14 is formed by a can container 81. Thus, crushed cans 60 may be collected in the can container 81. The can container 81 is preferably liquid-tight. Thus, even if a residual fluid is contained within the crushed can 60, the can container 81 prevents a leakage of said residual fluid.

Figure 11:
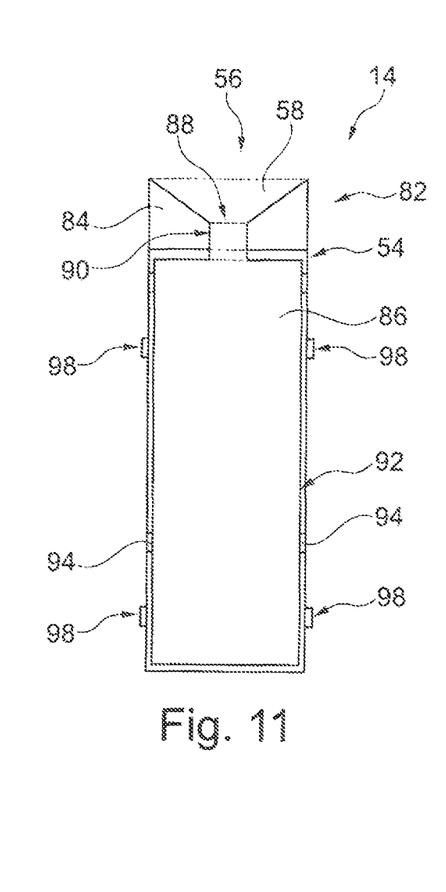
FIG. 11 schematically illustrates an example of the liquid waste module in a cross-sectional view.

FIG. 11 schematically illustrates a further exemplary embodiment of the waste module 14 in a cross-sectional view. The waste module 14 is configured as a liquid waste module 14. The liquid waste module 14 comprises a module housing 54. The liquid waste module 14 comprises at its top section 82 a funnel 84. The funnel 84 is connected to the module housing 54. Alternatively, the funnel 84 may be formed by the module housing 54. The funnel 84 forms at the top surface 56 of the module housing 54 a top opening 58 for inserting liquid waste. Furthermore, the liquid waste module 14 comprises a module waste chamber 86. The funnel 84 is at least indirectly connected to the module waste chamber 86. An output 88 of the funnel 84 may be connected, in particular via a liquid connection line 90, to an input opening to a liquid container 92. The inside space of the liquid container 92 forms the module waste chamber 86. Thus, liquid inserted through the top opening 58 into the funnel 84 will flow through the output 88 via, the liquid connection line 90 into the module waste chamber 86 formed by the liquid container 92. The liquid container is fluid-tight. Thus, liquid collected in the liquid container 92 is securely collected. The liquid container 92 is preferably configured as an exchangeable liquid container 92. Thus, the liquid container 92 may be releasably connected to the module housing 54. For this purpose, the liquid container 92 and the module housing 54 preferably comprises correspondingly configured connection means 94. The connection means 94 are configured to releasably connect and/or couple the liquid container 92 to the module housing 54. The liquid container 94 is arranged below the funnel 84. Thus, liquid inserted into the top opening 58 of the funnel 84 will flow automatically towards the module waste chamber 86 provided by the liquid container 92. Additionally, a drip stop may be located between the funnel and the liquid container.

According to a preferred example, the liquid waste module 14 may comprise two or more liquid containers 92. FIG. 3 exemplarily shows the liquid waste module 14, which is arranged in the middle of the module seating 12. As schematically illustrated in FIG. 3, two liquid containers 92 are arranged above each other, wherein each of the liquid containers 92 is releasably connected to the module housing 54. The upper liquid container 94 is connected, in particular via the liquid connection line 90, to the funnel 84. Thus, liquid inserted into the top opening 58 of the funnel 84 will flow into the module waste chamber 86 of the upper liquid container 92. In case the upper liquid container 92 is filled up with liquid, the upper liquid container 92 may be exchanged with the lower liquid container 92. As a result, further liquid waste may be collected. Since the volume of the waste chamber 86 of each liquid container 92 is limited, each liquid container 92 may be easily handable. For this purpose, each liquid container 92 may comprise a handle 96.

Furthermore, the module housing 54 of the liquid waste container 14 may comprise pins 98 at a lateral outside surface. Each of the pins 98 may be configured to interact with a rail 38 of a module seating 12 resulting in a linear guide when inserting the liquid waste module 14 into the module seating 12.

Figure 12:
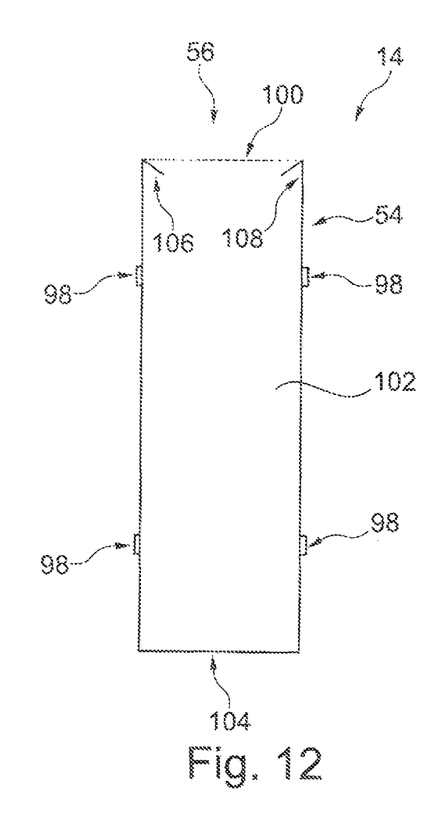
FIG. 12 schematically illustrates an example of the cup waste module in a cross-sectional view.

A further exemplary embodiment of the waste module 14 is schematically illustrated in FIG. 1.2 in a cross-sectional view. The waste module 14 is configured as a cup waste module 14. The cup waste module 14 comprises at its top surface 56 a top opening 100. Furthermore, the cup waste module 14 comprises a module housing 54. The module housing 54 may form said top opening 100 of the cup waste module 14. The module housing 54 further forms a waste chamber 102 for receiving cups. Thus, the module waste chamber 102 may comprise a circular cross-section. As a result, a cup inserted into the module waste chamber 102 may slide within the cup waste chamber without a rotation about radial axis of the cup. The cup may slide from the top opening 100 to the bottom 104 of the module housing 54 and/or to a cup already inserted in the module waste chamber 102. The circular cross section may be configured for different cup sizes. As a further result, cups may automatically be stacked in the module waste chamber 102. In order to prevent an unexpected dropout of a cup from the module waste chamber 102 to the environment, blocking lips 106 may be arranged at an upper inside surface section 108 of the module housing 54.

For providing a system 110 comprising the trolley 102 and at least one of the waste modules 14, at least one of the waste modules 14 is inserted into the module seating 12 of the trolley 2 and fastened by the respective module seating 12.

While certain embodiments of the invention have been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

The word "comprising" does not exclude other elements or steps, and the indefinite article "a" or "an" does not exclude a plurality. A single element or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A trolley for collecting waste, comprising:
   a housing comprising a main waste chamber for receiving waste and comprising at least one module seating, each of the at least one module seating configured to receive a respective waste module for collecting waste; and
   wheels attached to a bottom wall of the housing;
   wherein each module seating comprises fasteners, which are configured to releasably couple a respective waste module;
   wherein the trolley further comprises a liquid waste module configured to be received in one of the at least one module seating, the liquid waste module comprising a structure to direct flow of liquid from a top opening of the structure, to an output of the structure, and into a module waste chamber of the liquid waste module arranged below the structure, such that liquid inserted into the top opening of the structure flows into the module waste chamber; and
   wherein the structure of the liquid waste module comprises a funnel releasably connected to the module waster chamber.

2. The trolley according to claim 1, wherein each module seating forms a receiving space to at least partly receive a waste module.

3. The trolley according to claim 1, wherein each module seating comprises first connection means at its inside surface, which are configured to releasably interact with second connection means of a waste module.

4. The trolley according to claim 1, wherein each module seating extends to a side surface of the housing, wherein each module seating comprises a side opening at the side surface of the housing, such that a waste module can be inserted through the side opening into the respective module seating.

5. The trolley according to claim 1, wherein each module seating extends to a top surface of the housing, wherein each module seating comprises a top opening at the top surface of the housing, such that waste can be inserted through the top opening.

6. The trolley according to claim 5, wherein the housing of the trolley comprises a plurality of module seatings, which are arranged in parallel, such that the top-openings and/or side openings are arranged in parallel.

7. The trolley according to claim 1, further comprising a door, which is pivotably connected to the housing, such that the door can be pivoted between an opened position and a closed position, wherein the door closes the side surface of the housing at least partly, if the door is in the closed position, and wherein the door opens the side surface to the environment, if the door is in the opened position.

8. The trolley according to claim 1, further comprising a check valve arranged between the funnel and the module waste chamber of the waste module, wherein the check valve is configured to pass liquid from the funnel to the module waste chamber, and to block liquid to pass in an opposite direction.

9. The trolley according to claim 1, further comprising a liquid connection line that connects the output to an input opening of the module waste chamber.

10. The trolley according to claim 1, wherein the funnel is formed by the housing.

11. A system for collecting waste, comprising:
    a trolley comprising:
    a housing comprising a main waste chamber for receiving waste and comprising at least one module seating, each of the at least one module seating configured to receive a respective waste module for collecting waste; and
    wheels attached to a bottom wall of the housing;
    wherein each module seating comprises fasteners, which are configured to releasably couple a respective waste module; and
    a liquid waste module comprising:
    a module housing comprising a top surface, an outside surface, and a top opening at the top surface, the top opening for inserting liquid waste; and
    a module waste chamber for receiving liquid waste inserted through the top opening;
    wherein the module housing comprises second connection means at the outside surface, which are configured to releasably interact with first connection means of a trolley for collecting waste;
    wherein the liquid waste module is received by the at least one module seating and is releasably connected thereto;
    wherein the liquid waste module comprises a structure to direct flow of liquid from the top opening, to an output of the structure, and into the module waste chamber of the liquid waste module, such that liquid inserted into the top opening flows through the structure, to an output of the structure, and into the module waste chamber; and
    wherein the structure of the liquid waste module comprises a funnel releasably connected to the module waste chamber.

12. The system according to claim 11, further comprising a check valve arranged between the funnel and the module waste chamber of the waste module, wherein the check valve is configured to pass liquid from the funnel to the module waste chamber, and to block liquid to pass in an opposite direction.

13. The system according to claim 11, further comprising a liquid connection line that connects the output to an input opening of the module waste chamber.

14. The system according to claim 11, wherein the funnel is formed by the housing.

* * * * *